(12) United States Patent
Miyasaka

(10) Patent No.: US 6,886,955 B2
(45) Date of Patent: May 3, 2005

(54) ILLUMINATION STRUCTURE OF OPERATION BUTTONS PROVIDED ON CONTROL PANEL OF ELECTRONIC EQUIPMENT

(75) Inventor: Yasuhiro Miyasaka, Miyaqi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/272,457

(22) Filed: Oct. 16, 2002

(65) Prior Publication Data

US 2003/0128537 A1 Jul. 10, 2003

Related U.S. Application Data

(60) Provisional application No. 60/329,638, filed on Oct. 16, 2001.

(30) Foreign Application Priority Data

Oct. 18, 2001 (JP) ........................................ 2001-320630

(51) Int. Cl.[7] .............................................. G01D 11/28
(52) U.S. Cl. ........................... 362/29; 362/28; 362/559; 362/24; 362/23; 362/27; 362/85; 362/95; 200/313; 200/314; 200/315; 345/170
(58) Field of Search ............................ 362/29, 28, 559, 362/24, 23, 27, 85, 95; 200/313, 314, 315; 345/170

(56) References Cited

U.S. PATENT DOCUMENTS 6,467,924 B2 * 10/2002 Shipman ...................... 362/31

FOREIGN PATENT DOCUMENTS

JP          Hei 9-293423        11/1997

* cited by examiner

*Primary Examiner*—Stephen Husar
*Assistant Examiner*—Bertrand Zeade
(74) *Attorney, Agent, or Firm*—Brinks Hofer Gilson & Lione

(57) ABSTRACT

An illumination structure includes an operation button having a front face on which is formed an identifying indication of 'AUTO' made by exposing an opalescent synthetic resin to easily penetrate light and the other parts are painted in black. It also includes an illuminating part provided on a back of the operation button, which illuminates a back of the identifying indication, and plural protrusions in a shape of ribs that regulate an intensity of light penetrating through the identifying indication. In this structure, the plural protrusions obstruct and diffuse the light beams that advance from the illuminating part toward the back of the identifying indication, thereby achieving uniform emission of the light beams from the whole identifying indication. Further in the manufacturing process of the operation button, contraction of a front face of the operation button accompanied with coagulation of the synthetic resin is dispersed by the plural protrusions.

6 Claims, 2 Drawing Sheets

ILLUMINATION STRUCTURE OF OPERATION BUTTONS PROVIDED ON CONTROL PANEL OF ELECTRONIC EQUIPMENT This application claims benefit of Provisional application No. 60/329,638 filed Oct. 16, 2001

BACKGROUND OF THE INVENTION

1. Field of the Invention

The present invention relates to an illumination structure of operation buttons being components of an illuminating device that lights up identifying indications on the front faces of the operation buttons, which is provided on a control panel of electronic equipment installed in an automobile and so forth.

2. Description of the Related Art

Conventionally, some automobiles are provided with control panels for controlling electronic equipment such as an air conditioner on the front of the driving seat. On the front of the control panel, namely, on the front face of the driving seat are provided plural operation buttons. Pressing the operation buttons will achieve various operations such as power on/off, gas volume control, temperature control, automatic operation, and so forth. The front face of each operation button is provided with an identifying indication of letters or a symbol that indicates the operation performed by the operation button, such as power on/off, gas volume control, temperature control, automatic operation, or the like.

Such control panels are often provided with an illuminating device that brings the identifying indications on the front faces of the operation buttons into sight in a dark driver's cab. In this illuminating device, the identifying indications on the front faces of the operation buttons are made so as to transmit light. And, the illumination structure of the operation buttons is made such that an illuminating part composed of small lamps illuminates the identifying indications from the backs of the operation buttons.

The operation buttons are made of a synthetic resin of a color to easily transmit light, for example, an opalescent color. This synthetic resin is painted in a color difficult to transmit light, for example, a black color on the front and side formed in a shape of the operation button. Thereafter, the black paint is removed by the laser cutting to expose the opalescent synthetic resin, and thereby the identifying indications are made. That is, the identifying indications are made of the exposed parts of the opalescent synthetic resin, and the other parts of the synthetic resin are painted in black.

In the illumination structure of the operation buttons being thus constructed, as the illuminating part lights up the identifying indications from the backs of the operation buttons, the light beams transmit through the identifying indications to be emitted on the fronts of the operation buttons. Thus, the operator finds the identifying indications luminous, and thereby confirms the identifying indications of the operation buttons by visual observation in the dark driver's cab.

Now, in the foregoing illumination structure of the operation buttons, there appear luminous non-uniformities that the identifying indications are partially seen brilliant or dark, due to the shape and size of the operation buttons, and the positional relation between the operation buttons and the illuminating part. Accordingly, a measure to dissolve the luminous non-uniformities has been made by increasing the thickness of a part on which high-intensity light strikes, and by decreasing the thickness of a part on which low-intensity light strikes, of the back sides of the identifying indications.

In order to dissolve the luminous non-uniformities, an excessive increase of the thickness of a part on which high-intensity light strikes will sink the front faces of the operation buttons, because of contraction accompanied with the coagulation of the synthetic resin. If the operation buttons are formed such that the front faces of the operation buttons do not sink, it will cause luminous non-uniformities, although fine views of the operation buttons in shape can be secured. And, if the thickness is increased so as to dissolve the luminous non-uniformities, the front faces of the operation buttons will sink, although fine views of the operation buttons during illumination can be secured.

SUMMARY OF THE INVENTION

The present invention has been made in view of the foregoing circumstances, and an object of the invention is to provide an illumination structure of operation buttons that brings a solution to the sinking of the front faces of the operation buttons accompanied with the coagulation of the synthetic resin and the luminous non-uniformities at the same time.

According to one aspect of the invention, the illumination structure of operation buttons includes: an operation button; an illuminating part that illuminates a back of the operation button; a light penetrating part formed on a front of the operation button in a shape of an identifying indication, through which light from the illuminating part penetrates; and plural protrusions formed on the back of the operation button, which regulates an intensity of the light that penetrates through the light penetrating part.

The invention being thus constructed, the light that advances from the illuminating part toward the back of the operation button is obstructed and diffused by the plural protrusions when the light penetrates through the light penetrating part. Consequently, the intensity of the light that penetrates through the light penetrating part is regulated, and the light is emitted uniformly on the front face of the operation button from the whole light penetrating part, thus dissolving the luminous non-uniformities. Further, in the manufacturing process of the operation button, since the contraction of the front face of the operation button due to the coagulation of the synthetic resin is dispersed by the plural protrusions, the contraction of the front face of the operation button is just a little. Thereby, the operation button can be formed without making a recess on the front face thereof. Therefore, the invention dissolves the recess on the front face of the operation button accompanied with the coagulation of the synthetic resin and the luminous non-uniformities at the same time.

In the above invention, the protrusions may be located on a back of an area where the light penetrating part is provided. According to the invention having this construction, the light that strikes on the light penetrating part can be obstructed and diffused securely.

In the above invention, the protrusions may be provided in a shape of ribs. According to the invention having this construction, it is possible to securely obstruct and diffuse the light that advances toward the light penetrating part with a comparably small number of protrusions.

In the above invention, the protrusions may be formed in a shape of a trapezoid so as to protrude from a lower base toward an upper base of the trapezoid. According to the invention having this construction, part of another member can easily be placed near the slant areas of the protrusions (the area corresponding to the hypotenuse of the trapezoid), when the operation button is coupled with the other member.

DESCRIPTION OF THE PREFERRED EMBODIMENTS

A preferred embodiment of the illumination structure of operation buttons relating to the invention will be described with reference to the accompanying drawings.

Figure 1:
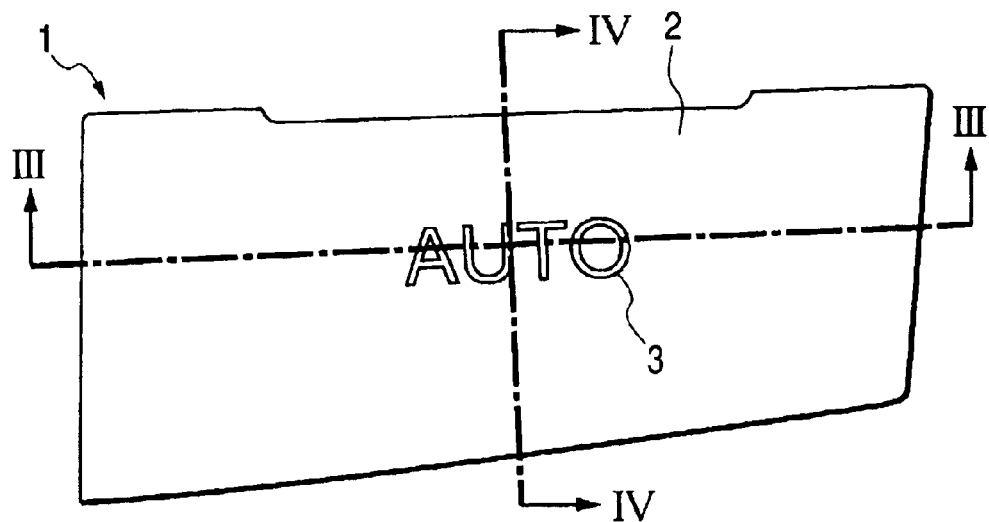
FIG. 1 is a front view illustrating one embodiment of an illumination structure of an operation button according to the present invention.
Figure 2:
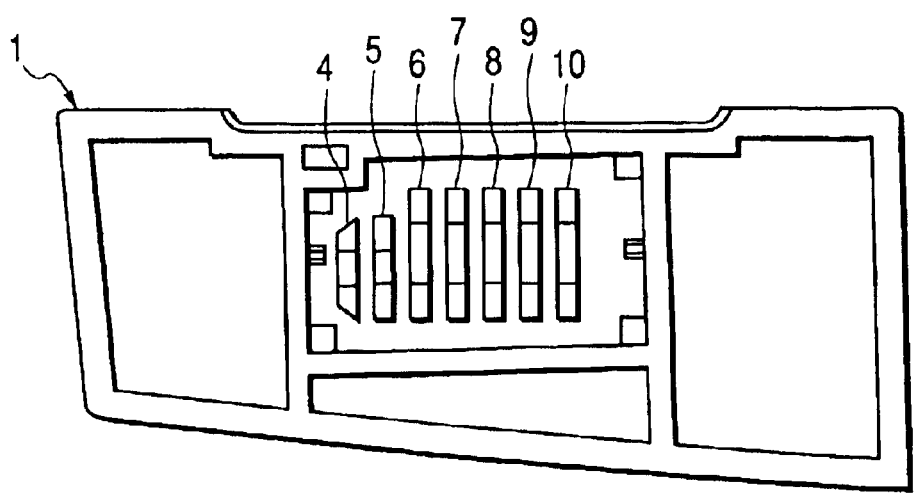
FIG. 2 is a back view of the embodiment illustrated in FIG. 1.
Figure 3:
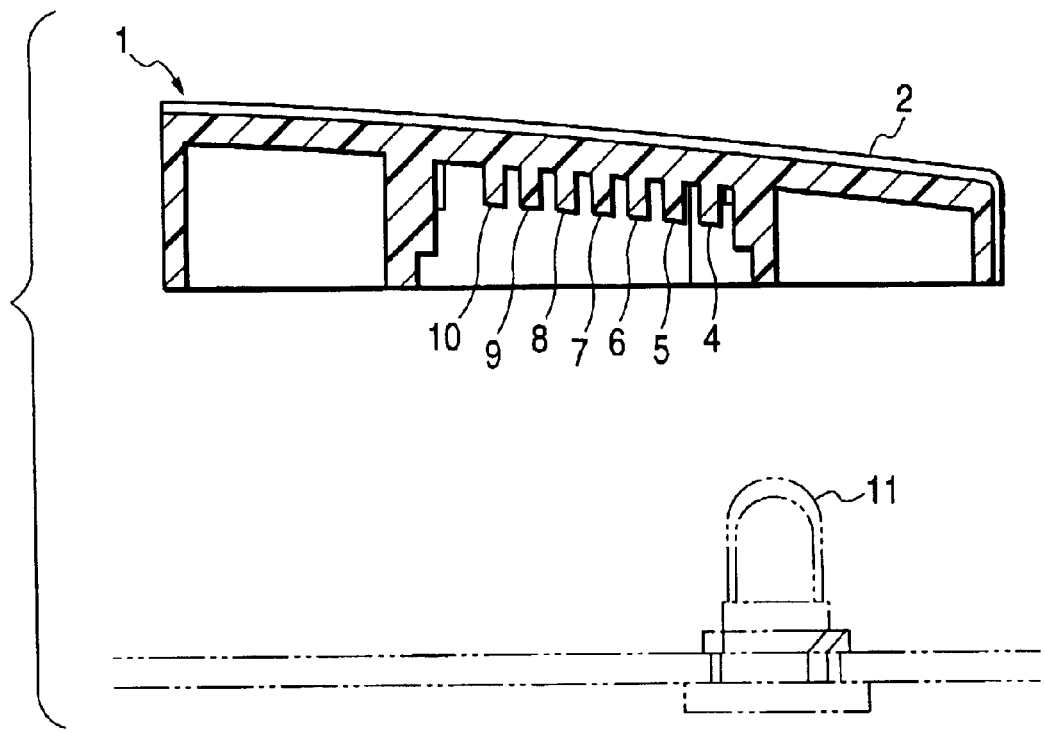
FIG. 3 is a sectional view taken on the line III—III in FIG. 1.
Figure 4:
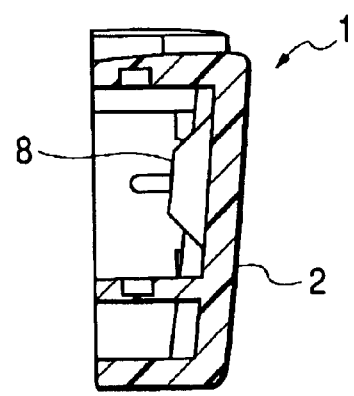
FIG. 4 is a sectional view taken on the line IV—IV in FIG. 1.

FIG. 1 is a front view illustrating the embodiment; FIG. 2 is a back view of the embodiment illustrated in FIG. 1; FIG. 3 is a sectional view taken on the line III—III in FIG. 1; and FIG. 4 is a sectional view taken on the line IV—IV in FIG. 1.

This embodiment relates to the illumination structure of operation buttons on a control panel of electronic equipment, for example, a control panel of an air conditioner installed in an automobile. Plural operation buttons are provided on the front of the control panel, namely, on the front of the driver's seat. The operation buttons are designed to perform various operations such as power on/off, gas volume control, temperature control, automatic operation, and so forth, by being pressed. The front of each operation button is provided with an identifying indication composed of letters or a symbol that indicates the operation performed by the operation button, out of power on/off, gas volume control, temperature control, automatic operation, and so forth.

This embodiment includes an operation button 1 having a front face 2 on which is provided an identifying indication 3, as shown in FIG. 1. The identifying indication 3 functions as a light penetrating part, which has a letter indication 'AUTO' that signifies, for example, the automatic operation of an air conditioner. It also includes an illuminating part 11 composed of a small lamp and so forth, which illuminates the back of the operation button 1, as shown in FIG. 3.

The operation button 1 is formed of a synthetic resin of a color to easily penetrate light, for example, an opalescent color. This synthetic resin is painted in a color difficult to penetrate light, for example, a black color on the front and side formed in a shape of the operation button 1. Thereafter, the black paint is removed by the laser cutting to expose the opalescent synthetic resin, and thereby the identifying indication 3 of 'AUTO' is made. That is, the identifying indication 3 is made of the exposed parts of the opalescent synthetic resin, and the other parts of the synthetic resin are painted in black.

Especially, this embodiment provides plural protrusions 4 through 10 in a shape of ribs, on the back of the area where the identifying indication 3 is made, as shown in FIG. 2 through FIG. 4. Each of the protrusions 4 through 10 is formed in a shape of a trapezoid, in a direction of protruding from the back of the operation button 1, so as to protrude from the lower base toward the upper base of the trapezoid, as shown in FIG. 4. The protrusions 4 through 10 are laid out virtually along the vertical direction to the identifying indication 3. Also, the protrusions 4 through 10 are formed integrally with the operation button 1 by means of, for example, a metal mold.

In this embodiment thus constructed, the light that the illuminating part 11 emits from the back of the operation button 1 penetrates through the identifying indication 3; accordingly, the operator finds the identifying indication 3 luminous. Thereby, the operator is able to confirm that the operation button 1 switches the air conditioner into the automatic operation control, by visual observation even in the dark driver's cab.

When the back of the operation button 1 is irradiated, the light beams that advanced toward the back of the identifying indication 3 of the operation button 1 are obstructed and diffused by the protrusions 4 through 10. Thereby, the intensity of the light that penetrates through the identifying indication 3 is regulated, and the light is emitted uniformly from the whole identifying indication 3 to the front face 2 of the operation button 1.

Thus in this embodiment, the light beams from the illuminating part 11 are obstructed and diffused by the protrusions 4 through 10, whereby the intensity of the light that penetrates through the identifying indication 3 is regulated, and the light beams are emitted uniformly from the whole identifying indication 3. Accordingly, the luminous non-uniformities can be dissolved. Further, in the manufacturing process of the operation button 1, the contraction of the front face 2 of the operation button 1 accompanied with the coagulation of the synthetic resin is dispersed by the protrusions 4 through 10; the contraction of the front face 2 of the operation button 1 is very limited accordingly. Therefore, the operation button 1 can be formed without making a recess on the front face 2 of the operation button 1. Therefore, the recess of the front face 2 of the operation button 1 accompanied with the coagulation of the synthetic resin and the luminous non-uniformities can be dissolved at the same time; that is, a fine view in shape as well as a fine view during illumination of the operation button 1 can be secured.

In this embodiment, since the size, shape, height, spacing, etc. of the protrusions 4 through 10 are set according to the intensity of the light from the illuminating part 11 that strikes on the back of the identifying indication 3, the illuminating part 11 can be set slant against the area where the identifying indication 3 is provided as shown in FIG. 3. Therefore, it is possible to increase the degree of freedom in the design, for example, to reduce the number of components by sharing one illuminating part with another, adjoining operation button not illustrated.

In this embodiment, the dimensions of the heights of the protrusions 4 through 10 (the dimension corresponding to the height of the trapezoid) are set equal to each other, as shown in FIG. 3; however, the invention is not limited to this. For example, there are differences in the intensities of the light that strikes on the backs of the identifying indications, resulting from the shapes and sizes of the operation buttons and the positional relations between the operation buttons and the illuminating parts. In that case, an adjustment may be made to increase the heights of the protrusions with regard to an area on which a high intensity light strikes, and to decrease the heights of the protrusions with regard to an area on which a low intensity light strikes, so that the intensities of the light from the illuminating parts can be regulated and the luminous non-uniformities can be dissolved.

Further, this embodiment allows the protrusions 4 through 10 made in a shape of ribs to securely obstruct and diffuse the light beams that advance toward the identifying indication 3 with a comparably small number of protrusions; however, the invention is not limited to this. For example, plural protrusions in a form of pillar or gimlet may be provided on the back of the identifying indication 3 to dissolve the luminous non-uniformities.

Further in the embodiment, since the protrusions 4 through 10 are formed in a trapezoid, when the operation button 1 is coupled with another member, the part of the other member can easily be located near the slant areas (the area corresponding to the hypotenuse of the trapezoid) of the protrusions 4 through 10. Thus, the embodiment enhances the facility of assembling the operation buttons and the other members; however, the invention is not limited to this. That is, the protrusions 4 through 10 may take on the other shape than the trapezoid, as long as it does not obstruct the coupling of the operation button 1 with another member.

According to the invention thus constructed, the intensity of the light that penetrates through the light penetrating part is regulated by the plural protrusions, and the light is emitted uniformly from the whole light penetrating part; accordingly, the luminous non-uniformities can be dissolved. And in the manufacturing process of the operation button, since the contraction of the front face of the operation button accompanied with the coagulation of the synthetic resin is dispersed by the plural protrusions, the contraction of the front face of the operation button is just a little; thereby, the operation button can be formed without making a recess on the front face of the operation button. Therefore, the recess of the front face of the operation button accompanied with the coagulation of the synthetic resin and the luminous non-uniformities can be dissolved at the same time; that is, a fine view in shape as well as a fine view during illumination of the operation button can be secured.

In the aforementioned invention, to locate the protrusions on the back of the area where the light penetrating part is provided will securely obstruct and diffuse the light beams that strike on the light penetrating part, thereby achieving secure regulation of the intensities of the light beams that penetrate through the light penetrating part.

In the aforementioned invention, to provide the protrusions in a shape of ribs will make it possible to securely obstruct and diffuse the light beams that advance toward the light penetrating part, and the protrusions can easily be formed with the body of the operation button by means of a metal mold.

In the aforementioned invention, to form the protrusions in a shape of a trapezoid so as to protrude from the lower base toward the upper base of the trapezoid will make part of another member to easily be placed near the slant areas of the protrusions (the area corresponding to the hypotenuse of the trapezoid) when the operation button is coupled with the other member, thus enhancing the ease of assembling the operation button.

What is claimed is:

1. An illumination structure of operation buttons, comprising:

an operation button;

an illuminating part that illuminates a back of the operation button;

a light penetrating part formed on a front of the operation button in a shape of an identifying indication, through which light from the illuminating part penetrates; and a plurality of protrusions is formed integrally with the operation button on the back of the operation button, which regulates an intensity of the light that penetrates through the light penetrating part.

2. An illumination structure of operation buttons according to claim 1, wherein the plurality of protrusions is located on a back of an area where the light penetrating part is provided.

3. An illumination structure of operation buttons according to claim 1, wherein the plurality of protrusions is provided in a shape of ribs.

4. An illumination structure of operation buttons according to claim 3, wherein the plurality of protrusions is formed in a shape of a trapezoid so as to protrude from a lower base toward an upper base of the trapezoid.

5. An illumination structure of operation buttons according to claim 2, wherein the plurality of protrusions is provided in a shape of ribs.

6. An illumination structure of operation buttons according to claim 5, wherein the plurality of protrusions is formed in a shape of a trapezoid so as to protrude from a lower base toward an upper base of the trapezoid.

* * * * *